(12) United States Patent
Rae

(10) Patent No.: US 8,857,657 B2
(45) Date of Patent: Oct. 14, 2014

(54) COOKWARE ARTICLE WITH A HOLLOW HANDLE

(75) Inventor: Robert A. Rae, Las Vegas, NV (US)

(73) Assignee: Meyer Intellectual Properties Limited (VG)

( * ) Notice: Subject to any disclaimer, the term of this patent is extended or adjusted under 35 U.S.C. 154(b) by 0 days.

(21) Appl. No.: 13/701,775

(22) PCT Filed: Jun. 17, 2011

(86) PCT No.: PCT/US2011/040988
§ 371 (c)(1),
(2), (4) Date: Dec. 18, 2012

(87) PCT Pub. No.: WO2012/005927
PCT Pub. Date: Jan. 12, 2012

(65) Prior Publication Data
US 2013/0161335 A1 Jun. 27, 2013

Related U.S. Application Data

(60) Provisional application No. 61/359,693, filed on Jun. 29, 2010.

(51) Int. Cl.
*A47J 45/06* (2006.01)
*A47J 27/00* (2006.01)
*A47J 37/10* (2006.01)

(52) U.S. Cl.
CPC .............. *A47J 37/10* (2013.01); *A47J 27/002* (2013.01); *A47J 45/061* (2013.01); *A47J 45/06* (2013.01)

USPC ............. 220/759; 220/573.1; 16/425; 29/469

(58) Field of Classification Search
CPC ......... A47J 45/071; A47J 45/07; A47J 45/06; A47J 45/061; A47J 36/02; A47J 37/10; B65D 25/2817; B65D 25/2805; B65D 25/2802; B65D 25/28
USPC ............. 220/573.1, 912, 759, 756, 752, 751, 220/755; 16/422, 425; 29/469, 428; D7/395, 393, 361
See application file for complete search history.

(56) References Cited

U.S. PATENT DOCUMENTS

| | | | | |
|---|---|---|---|---|
| 1,488,397 A | * | 3/1924 | Judge et al. | 220/23.4 |
| 1,635,119 A | * | 7/1927 | Dziuba et al. | 220/759 |
| 1,933,890 A | * | 11/1933 | Carlson | 220/751 |
| 2,282,011 A | * | 5/1942 | Vischer, Jr. | 220/203.22 |
| 7,204,387 B2 | | 4/2007 | Munari | |
| 2009/0084803 A1 | | 4/2009 | Pasquini | |

FOREIGN PATENT DOCUMENTS

| | | |
|---|---|---|
| EP | 1236428 A1 | 10/2004 |
| EP | 2140792 A1 | 1/2010 |
| JP | 2003174973 A | 6/2003 |

* cited by examiner

*Primary Examiner* — Robert J Hicks
(74) *Attorney, Agent, or Firm* — Edward S. Sherman

(57) ABSTRACT

An article of cookware has a hollow outward extending handle that is subdivided into a flange, a tubular or hollow grip portion and a terminal portion that seals the grip portion. The terminal portion is also hollow, but has a downward facing aperture to facilitate storage in a vertical position.

20 Claims, 4 Drawing Sheets

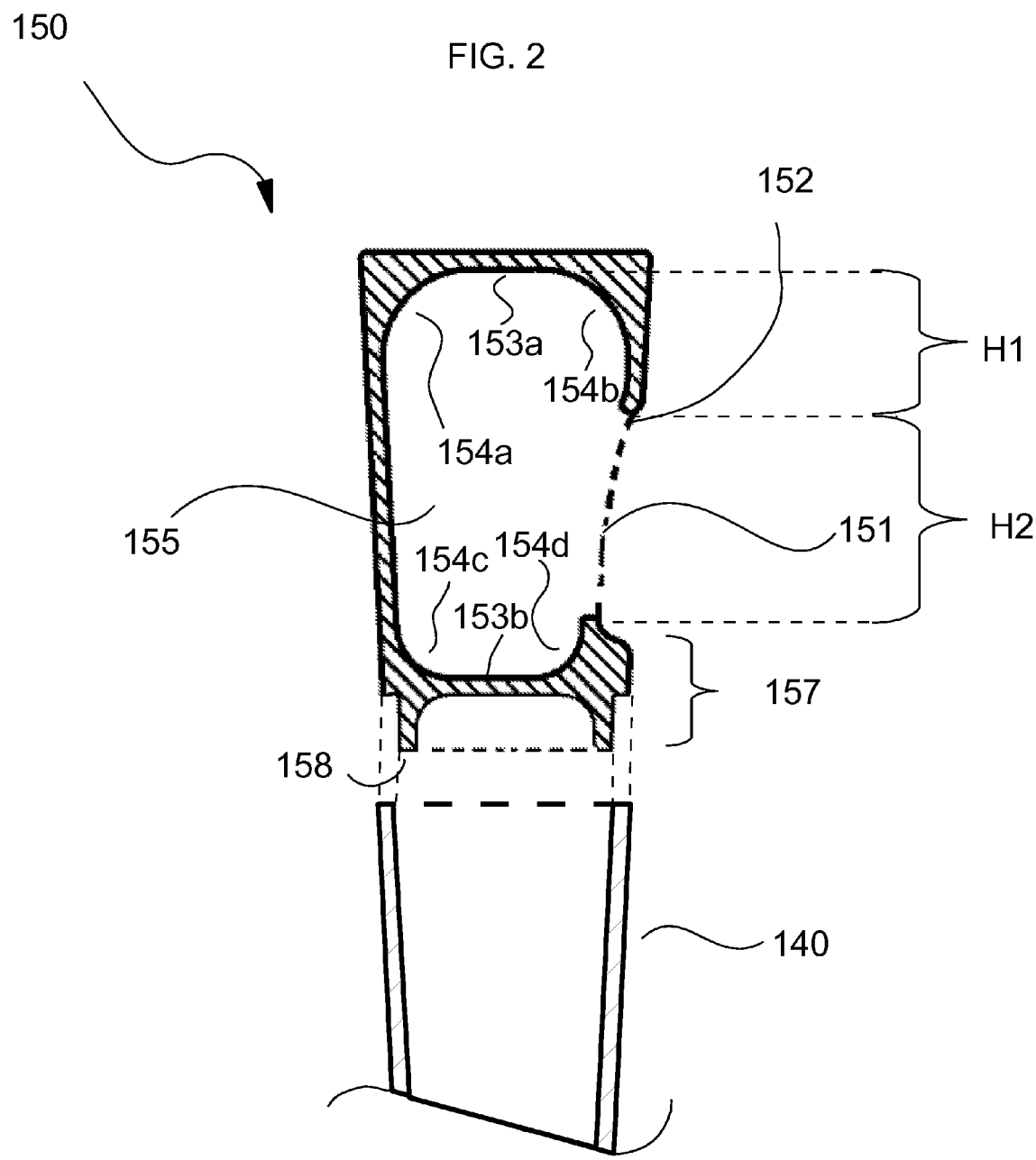

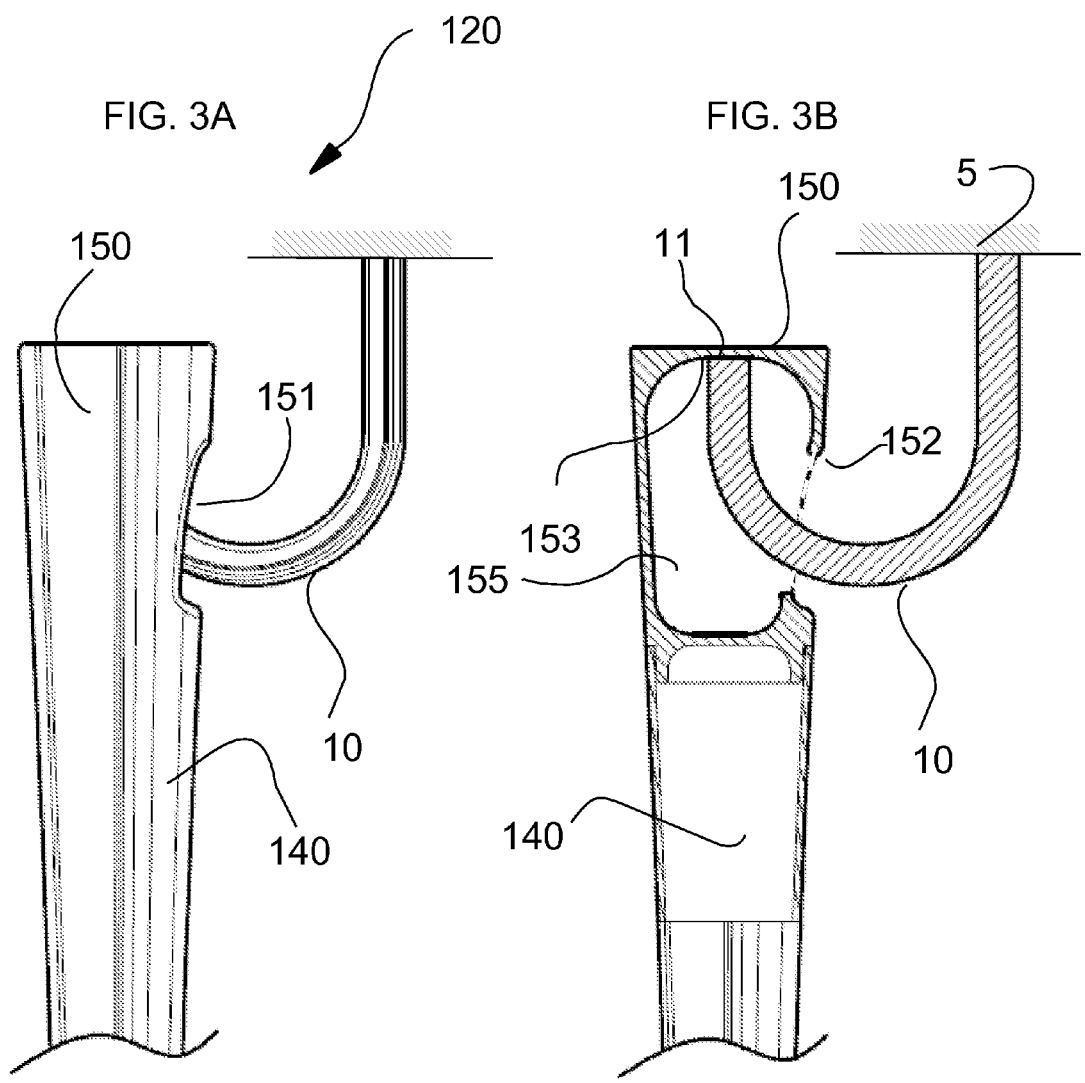

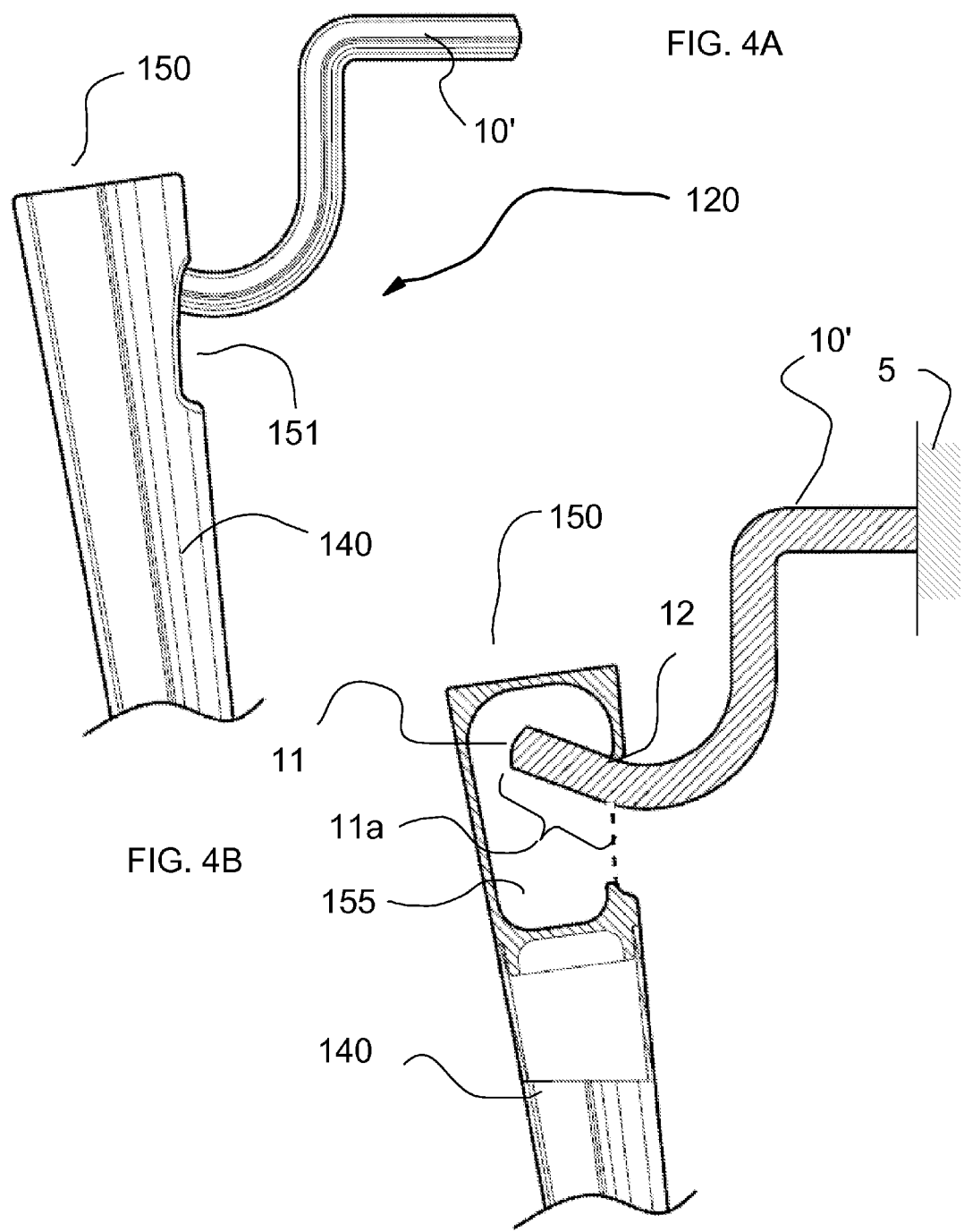

COOKWARE ARTICLE WITH A HOLLOW HANDLE

CROSS REFERENCE TO RELATED APPLICATIONS

The present application claims the benefit of priority to the U.S. Provisional Patent application of the same title that was filed on Jun. 29, 2010, having application Ser. No. 61/359,693, which is incorporated herein by reference.

The present application also claims the benefit of priority to the PCT application of the same title filed on Jul. 17, 2011, having international application no. PCT/US2011/040988, which is incorporated herein by reference.

BACKGROUND OF INVENTION

The present invention relates to a cookware article, and in particular to a handle for cookware, and an article of cookware deploying such a handle.

Cookware handles commonly have holes at the end for receiving hooks or pegs for vertically hanging in a kitchen. Hollow handles are preferred for their lighter weight, as well as lower conductivity of heat, with respect to solid metal handles. As the hollow handle also dissipates heat, is provides the user with greater latitude to directly grasp the handle when cookware article is used on a stove top for a generally reasonable period of time. Hollow handles can also be relatively large for easy and secure gripping, but remain light in weight so the pan is not tipped over.

However, providing a hanging hole in a hollow handle presents some problem and complexity in its design and manufacturing, as it is desirable to prevent water and other materials from entering the hollow handle and flowing toward the flange where it would be heated and possibly produce steam. Thus, this hanging hole is preferably a pipe that extends downward through the open cavity of the handle to seal it, or in fact a solid plug at the end of the cookware with a simple bore through it. The former approach of providing a sealed pipe through the hollow portion is more complex to manufacture than a solid plug. However, the solid plug adds weight, in contradiction to the otherwise beneficial attribute of a hollow handle.

It is therefore a first object of the present invention to provide a generally hollow handle with a hanging mount that is simpler to manufacture without adding significant weight.

It is a further object of the invention to provide a hollow handle with a hanging mount that is unlikely to collect or accumulate debris.

SUMMARY OF INVENTION

In the present invention, a primary objective is achieved by providing an article of cookware comprising: a cookware vessel having a bottom and substantially upright surrounding sidewalls to provide a container capable of retaining fluid; a handle attached to the sidewall of said cookware vessel and extending outward therefrom, the handle comprising: a flange portion attached to the sidewall of the cookware vessel, a hollow tubular grip portion having a first terminal end attached to said flange portion, the hollow tubular grip portion then extending outward therefrom to a second terminal end opposite the first terminal end, a hollow terminal portion that connects to said hollow tubular grip portion that extends outward in the same direction therefrom, being sealed at a proximal terminal end adjacent the connection to said hollow tubular grip portion, with a downward facing aperture defined by a rim for vertically hanging the article of cookware, and further comprising a sealed distal terminal end generally opposite said proximal terminal end wherein said flange portion and hollow terminal portion respectively seal the opposing first and second terminal ends of said hollow tubular grip portion.

Another objective is achieved by providing handle for an article of cookware comprising a flange portion having means for attached to the sidewall of a cookware article, a hollow tubular grip portion having a first terminal end attached to said flange portion, the hollow tubular grip portion then extending outward therefrom to a second terminal end opposite the first terminal end, a hollow terminal portion that connects to said hollow tubular grip portion that extends outward in the same direction therefrom, being sealed at a proximal terminal end adjacent the connection to said hollow tubular grip portion, with a downward facing aperture defined by a rim for vertically hanging the article of cookware, and further comprising a sealed distal terminal end generally opposite said proximal terminal end wherein said flange portion and hollow terminal portion respectively seal the opposing first and second terminal ends of said hollow tubular grip portion.

Another objective of the invention is achieved by providing a method of forming a handle for an article of cookware, the method comprising the steps of providing a first tubular member open at least at a first end and having a second end opposite the first end thereof, the second end being adapted for attachment to the sidewall of a cookware vessel, providing a second tubular member that is shorter in a tube axis direction than the first tubular member, which is sealed at the first end and at a second end, the second end being opposite the first end thereof, the second tubular member having an aperture defined by a rim on one side, the aperture being disposed between the first and second end thereof, attaching at least one end of the first and second ends of the second tubular member to the first end of the first tubular member to close the opening therein.

The above and other objects, effects, features, and advantages of the present invention will become more apparent from the following description of the embodiments thereof taken in conjunction with the accompanying drawings.

BRIEF DESCRIPTION OF DRAWINGS

FIG. 1A is a side elevation of a cookware article and handle, whereas

FIG. 2 is a cross-sectional elevation through the end section of the handle.

FIG. 3A is an exterior elevation of the handle in use in a second hook configuration, whereas FIG. 3B is a cross-sectional elevation through the handle and hook in FIG. 3A.

FIG. 4A is an exterior elevation of the handle in use in a second hook configuration, whereas FIG. 4B is a cross-sectional elevation through the handle and hook in FIG. 4A.

DETAILED DESCRIPTION

Figure 1A:
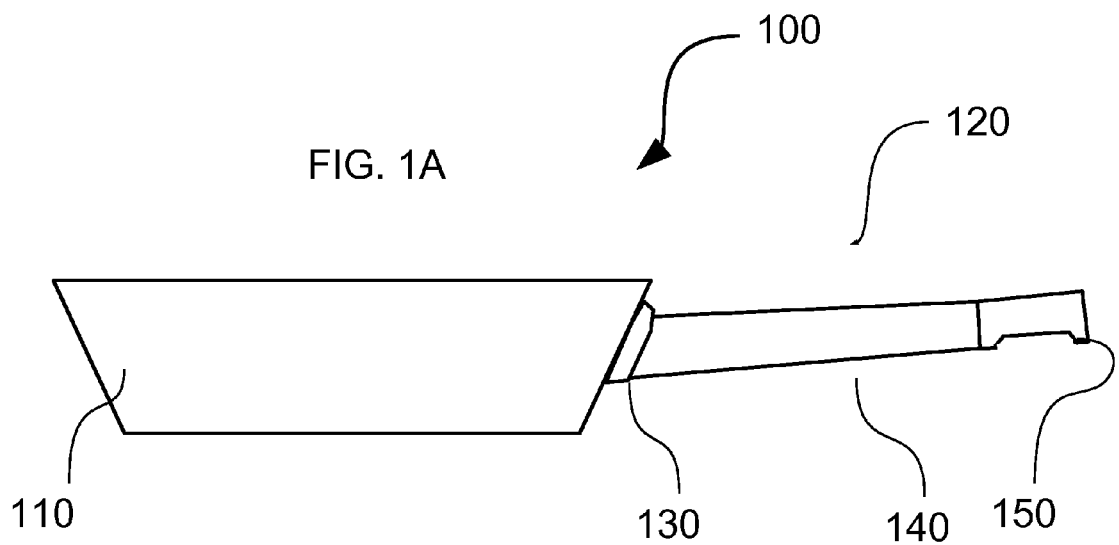
Figure 1B:
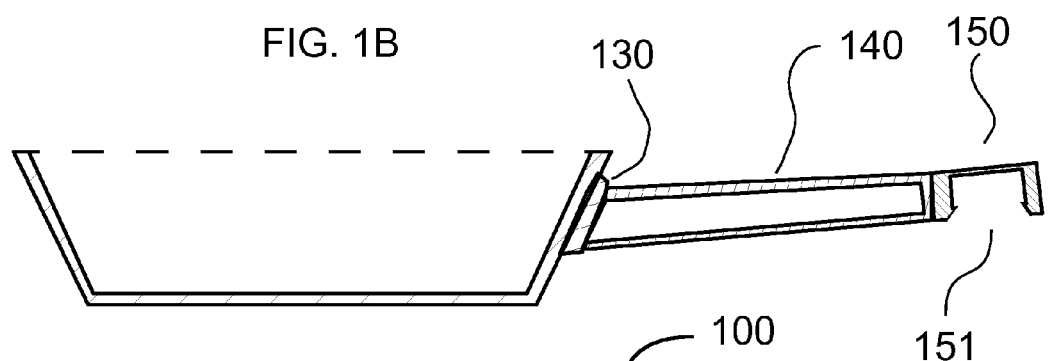
FIG. 1B is a cross-sectional elevation through the cookware article and handle in FIG. 1A.
Figure 1C:
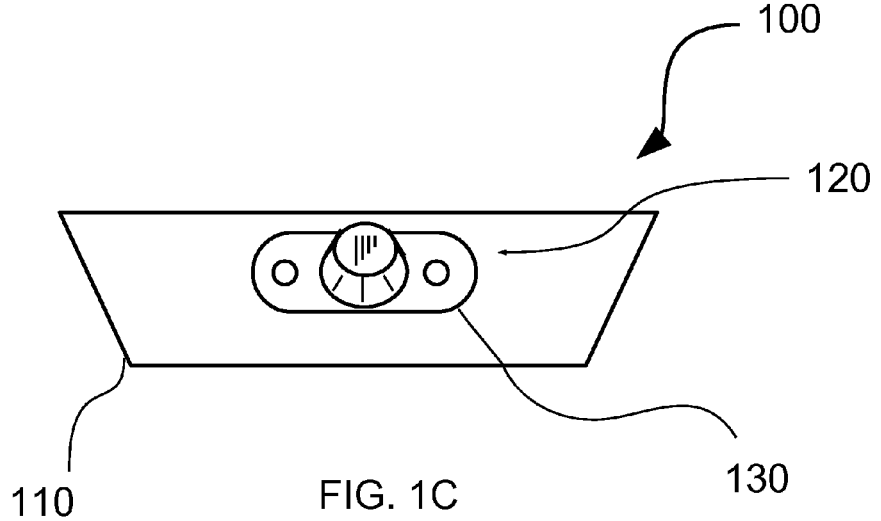
FIG. 1C is a front elevation of the cookware article and handle of FIG. 1A.

Referring to FIGS. 1A through 4B, wherein like reference numerals refer to like components in the various views, there is illustrated therein a new and improved cookware article, generally denominated 100 herein In accordance with the present invention, the cookware article 100 has a vessel portion capable of retaining fluid 110 and a hollow handle 120 that has three sections, the first of which is a flange section 130 that is generally solid for attachment to the sidewall of a pot, pan or other cooking vessel 110. The flange section 130 typically is winged shaped with respect to the hollow handle portion 120 that extends in the generally orthogonal direction therefrom, and typically has 2 or more mounting or rivets holes. Next, a hollow sealed tubular grip portion 140 is attached to the terminal portion of the flange section 130 distal from the vessel 110. The third portion of the hollow handle 120 is a terminal section 150 that is plugged at the end opposite the connection to the grip portion 140, and otherwise has a hollow cavity 155, with at least one side opening or aperture having rim 151 that is spaced apart from the far end of the cavity 155. The aperture is preferably downward facing to prevent contaminating from food spatter or dripping utensils while the cookware article is used.

FIG. 2 illustrates in further details more preferred embodiments of the cookware handle 120, showing the terminal portion 150 having a cavity 155 with an aperture defined by rim 151. The cavity 155 has curved inner sides 154*a*, 154*b*, 154*c* and 154*d*. Disposed between curved inner sides 154*a* and 154*b* is a flat inner upper surface 153*a*. The rim 151 has an upper edge 152 toward the side thereof most distal from the grip portion 140. The handle 120 is preferably constructed of stainless steel, but may combine other metals, and include a rubber grip coating. The curved inner sides 154*a*-154*d* facilitate cleaning and discourage attachment of debris within cavity 155. The curved inner sides preferably have a radius of curvature of at least about 2 mm. Ideally rim 151 terminates close to the bottom inner surface 153*b*, just above the end of the curve of inner sides 154*c*, of cavity 155, which along with the inner smoothly curved inner sides facilities draining of fluid that may enter during cleaning It is also preferable that the rim 151 of the aperture is displaced closer to the end of the termination portion most proximal to the cookware article 100 than the opposing which is more distal from the cookware article 100.

Terminal portion 150 is preferably fabricated with a sealed lower portion 157 that engages the opening in the hollow grip portion 140 at a lower rim 158 having the same shape but slightly smaller inner dimensions of adjacent portion of the grip portion 140 to aid in the assembly of handle 120.

Further, the upper portion of the cavity 155 from the upper edge 152 of rim 151 to the inner surface 153, denoted H1, is preferably at least 25% of the vertical extent of the aperture defined by rim 151, denoted as H2. Thus, the portion of the cavity in the direction of the handle 120 that is closed, and not open via aperture 151 is at least about 20% of the total height of cavity 155.

FIGS. 3A and 3B show one mode of using a hanging hook 10 to suspend the cookware article 100 from a fixed upper surface 5. The hanging hook 10 terminates in end surface 11. In this embodiment the end 11 of the hanging hook is optionally flat and supported substantially horizontally to fixed upper surface 5. This flat end 11 enters cavity 155 of handle 120 at rim 151 to support the pan 100 by making contact with the flat inner upper surface 153 of cavity 151.

FIGS. 4A and 4B show another mode of using a hanging hook 10' to suspend the cookware article 100 from a fixed side surface 5', but is equally applicable to a hook 10 that can pivot. In this embodiment a portion 11*a* of the hanging hook 10 enters cavity 155 of handle 150, but cooking article 100 is supported at the upper edge 152 of rim 151 which contacts the distal end of portion 11*a*, denoted as 12. Portion H1 is preferably at least about 5 mm to secure hook 10'. H2 is preferably about 20 mm or longer to facilitate the user inserting the end 11 of hook 10 into rim 151.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

I claim:

1. An article of cookware comprising:
   a) a cookware vessel having a bottom and substantially upright surrounding sidewalls to provide a container capable of retaining fluid;
   b) a handle coupled to the upright surrounding sidewalls of said cookware vessel and extending outward therefrom, the handle comprising:
      i) a flange portion attached to the upright surrounding sidewalls of the cookware vessel,
      ii) a hollow tubular grip portion having a first terminal end attached to said flange portion, the hollow tubular grip portion then extending outward therefrom to a second terminal end opposite the first terminal end,
      iii) a hollow terminal portion that connects to said hollow tubular grip portion that extends outward in the same direction therefrom, being sealed at a proximal terminal end adjacent the connection to said hollow tubular grip portion, with a downward facing aperture defined by a rim for vertically hanging the article of cookware, and further comprising a sealed distal terminal end generally opposite said proximal terminal end wherein said flange portion and hollow terminal portion respectively seal the opposing first and second terminal ends of said hollow tubular grip portion.

2. An article of cookware according to claim 1 wherein said hollow terminal portion has a plurality of curved inner surfaces.

3. An article of cookware according to claim 2 wherein the hollow termination portion has a plurality of planar internal surfaces that are connected by said curved inner surfaces.

4. An article of cookware according to claim 3 wherein the curved inner surfaces connecting the planar internal surfaces have radii of curvature of at least about 2 mm.

5. An article of cookware according to claim 3 wherein the rim is displaced closer to the proximal terminal end of the hollow sealed tubular grip portion than to the distal terminal end thereof.

6. An article of cookware according to claim 5 wherein an internal distance between the rim of the aperture closest to the distal terminal end and the distal terminal end is at least about 5 mm.

7. An article of cookware according to claim 5 wherein an internal distance between the rim of the aperture closest to the distal terminal end and the distal terminal end is at least about 25% of the vertical extent of the aperture defined by rim.

8. An article of cookware according to claim 1 wherein the handle is fabricated from stainless steel.

9. A handle for an article of cookware comprising:
   a) a flange portion having means for attaching to a sidewall of a cookware article,
   b) a hollow tubular grip portion having a first terminal end attached to said flange portion, the hollow tubular grip portion then extending outward therefrom to a second terminal end opposite the first terminal end,
   c) a hollow terminal portion that connects to said hollow tubular grip portion that extends outward in the same direction therefrom, being sealed at a proximal terminal end adjacent the connection to said hollow tubular grip portion, with a downward facing aperture defined by a rim for vertically hanging the article of cookware, and further comprising a sealed distal terminal end generally opposite said proximal terminal end wherein said flange portion and hollow terminal portion respectively seal the opposing first and second terminal ends of said hollow tubular grip portion.

10. A handle for an article of cookware according to claim 9 wherein said hollow termination portion has a plurality of curved inner surfaces.

11. A handle for an article of cookware according to claim 10 wherein the hollow terminal portion has a plurality of generally planar internal sides wherein the cured inner surfaces are at transitions between corners and edges of said generally planar internal sides and have radii of curvature of at least about 2 mm.

12. A handle for an article of cookware according to claim 10 wherein the aperture defining rim is disposed closer to the proximal terminal end of the hollow sealed tubular grip portion than to the distal terminal end thereof.

13. A handle for an article of cookware according to claim 12 wherein an internal distance between the rim of the aperture closest to the distal terminal end is at least about 5 mm.

14. A handle for an article of cookware according to claim 12 wherein an internal distance between the rim of the aperture closest to the distal terminal end is at least about 25% of the vertical extent of the aperture defined by rim.

15. A handle for an article of cookware according to claim 9 wherein the handle is fabricated from stainless steel.

16. A method of forming a handle for an article of cookware, the method comprising the steps of:

a) providing a first tubular member open at least at a first end and having a second end opposite the first end thereof, the second end being adapted for attachment to a sidewall of a cookware vessel, b) providing a second tubular member that is shorter in a tube axis direction than the first tubular member, which is sealed at the first end and at a second end, the second end being opposite the first end thereof, the second tubular member having an aperture defined by a rim on one side, the aperture being disposed between the first and second end thereof, c) attaching at least one end of the first and second ends of the second tubular member to the first end of the first tubular member to close the opening therein.

17. A method of forming a handle for an article of cookware according to claim 16 wherein the second tubular member has a plurality of curved inner surfaces.

18. A method of forming a handle for an article of cookware according to claim 17 wherein the curved inner surfaces have radii of curvature of at least about 2 mm.

19. A method of forming a handle for an article of cookware according to claim 17 wherein the rim of the aperture is disposed closer to the end connected to the first tubular member than to the end not connected to the second tubular member.

20. A method of forming a handle for an article of cookware according to claim 19 wherein internal distance between the rim of the aperture most distal to the first tubular member and an interior end of the second tubular member most distal from the first tubular member is at least about 5 mm.

* * * * *